(12) United States Patent
Beckerle

(10) Patent No.: US 6,289,474 B1
(45) Date of Patent: Sep. 11, 2001

(54) COMPUTER SYSTEM AND PROCESS FOR CHECKPOINTING OPERATIONS ON DATA IN A COMPUTER SYSTEM BY PARTITIONING THE DATA

(75) Inventor: Michael J. Beckerle, Needham, MA (US)

(73) Assignee: Torrent Systems, Inc., Cambridge, MA (US)

( * ) Notice: Subject to any disclaimer, the term of this patent is extended or adjusted under 35 U.S.C. 154(b) by 0 days.

(21) Appl. No.: 09/104,288

(22) Filed: Jun. 24, 1998

(51) Int. Cl.[7] ................................................ G06F 11/14
(52) U.S. Cl. .................................. 714/37; 714/13
(58) Field of Search ........................... 714/15, 19, 20, 714/37, 38, 16, 13, 17, 11

(56) References Cited

U.S. PATENT DOCUMENTS

| | | |
|---|---|---|
| 5,363,503 | 11/1994 | Gleeson . |
| 5,819,021 * | 10/1998 | Stanfill et al. .......................... 714/15 |
| 5,872,907 * | 2/1999 | Griess et al. ............................ 714/17 |
| 5,909,581 * | 6/1999 | Park ...................................... 395/712 |
| 6,032,267 * | 2/2000 | Fishler et al. .......................... 714/11 |

OTHER PUBLICATIONS

Jim Gray and Andreas Reuter,*Transaction Processiing: Concepts and Techniques*(Morgan–Kaufman Publishers, 1993), (pp. 210–217).

Tom Barclay, Robert Barnes, Jim Gray, and Prakash Sundaresan, "Loading Databases Using Dataflow Parallelism ," *In Sigmod Record*, vol. 23, No. 4, Dec. 1994.

R. Koo and S. Toueg, "Checkpointing and rollback–recovery for distrubuted systems," *IEEE Trans. Software Eng.*, SE–13–23–31, Jan. 1987.

Y. Tamir and C. H. Sequin, "Error recovery in multicomputers using global checkpoints," *Proc. 13th Int. Conf. Parallel Processing*, pp. 32–41, Aug. 1984.

Y. M. Wang and W. K. Fuchs "Lazy checkpoint coordination for bounding rollback propagation," in *Proc. 12th Symp. On Reliable Distrubuted Sys.*, pp. 78–85, Oct. 1993.

K. Li, J. F. Naughton, and J. S. Plank,"Checkpoint multicomputer applications," in *Proc. 10th IEEE Symp. Reliable Distributed Sys.* pp. 2–11, Oct. 1991.

* cited by examiner

*Primary Examiner*—Ly V. Hua
(74) *Attorney, Agent, or Firm*—Wolf, Greenfield & Sacks, P.C.

(57) ABSTRACT

Checkpointing of operations on data may be provided by partitioning the data into temporal segments. Operations may be performed on the temporal segments and checkpoints may be established by storing a persistent indication of the segment being processed. The entire processing state need not be saved. If a failure occurs, processing can be restarted using the saved indication of the segment to be processed. Such data partitioning and checkpointing may be applied to relational databases, databases with dataflow operation and/or parallelism and other database types with or without parallel operation.

4 Claims, 10 Drawing Sheets

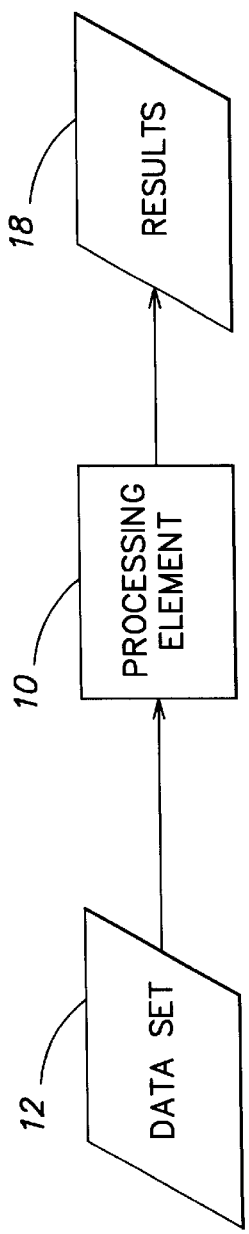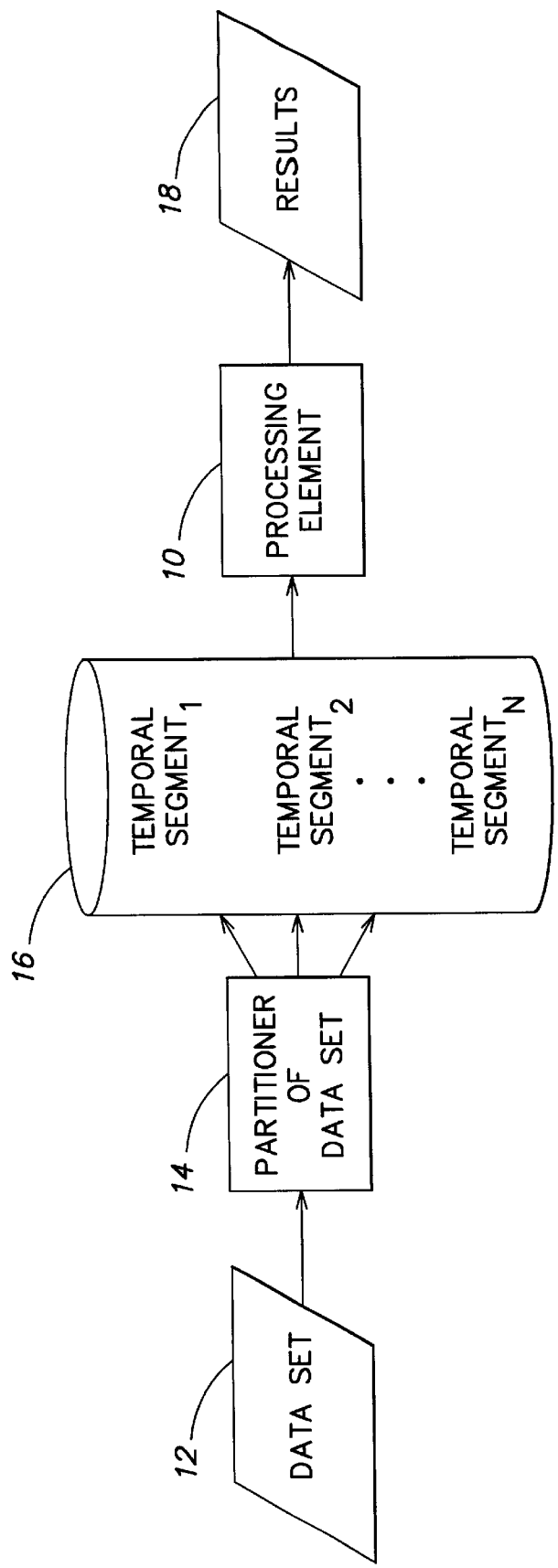

COMPUTER SYSTEM AND PROCESS FOR CHECKPOINTING OPERATIONS ON DATA IN A COMPUTER SYSTEM BY PARTITIONING THE DATA

BACKGROUND

A common problem in computer systems, particularly transaction-based computer systems operating on a database, is providing some form of tolerance or resilience to failures that may occur during processing. Such tolerance typically is provided by checkpointing and redundancy. Checkpointing typically involves periodically saving the processing state of a machine and, after detection of a failure, restoring the state of the computer to a previously saved internally consistent processing state. Computer systems that provide checkpointing and redundancy typically use specially designed hardware and/or operating systems, or require an application programmer to create appropriate checkpoints.

The complexities of providing a checkpointing facility are increased in dataflow and parallel computer systems, particularly dataflow systems used on parallel databases, and the Orchestrate application environment from Torrent Systems, Inc., and other similar products. Some of these problems are explored, in part, in "Loading Databases Using Dataflow Parallelism," *SIGMOD Record*, Volume 23, Number 4, pages 72–87, December 1994.

SUMMARY

Checkpointing of operations on data may be provided by partitioning the data into temporal segments. Operations may be performed on the temporal segments and checkpoints may be established by storing a persistent indication of the segment being processed. The entire processing state need not be saved. If a failure occurs, processing can be restarted using the saved indication of the segment to be processed. Such data partitioning and checkpointing may be applied to relational databases, databases with dataflow operation and/or parallelism and other database types with or without parallel operation.

Accordingly, in one aspect, checkpointing operations on data by a processing element in a computer system involves partitioning the data into temporal segments for processing by the processing element. One of the temporal segments is selected. A persistent indication of the selected temporal segment is saved. The selected temporal segment is processed by the processing element. When a failure of the processing element is detected, any outputs generated by the processing element for the selected temporal segment are discarded and the selected temporal segment corresponding to the saved persistent indication is reprocessed. When processing by the processing element completes without failure, the outputs produced by the processing element may be saved. The next temporal segment to be processed by the processing element is then selected. When the data is retrieved from a relational database using a query, the retrieved data may be stored in persistent storage. In such a case, the data partitioned into the temporal segment is the data stored in persistent storage.

BRIEF DESCRIPTION OF THE DRAWING

In the drawing,

FIG. 1A is a dataflow diagram illustrating a processing element operating on a data set to provide results;

FIG. 1B is a dataflow diagram illustrating how the data set may be partitioned into temporal segments;

DETAILED DESCRIPTION

Figure 2:
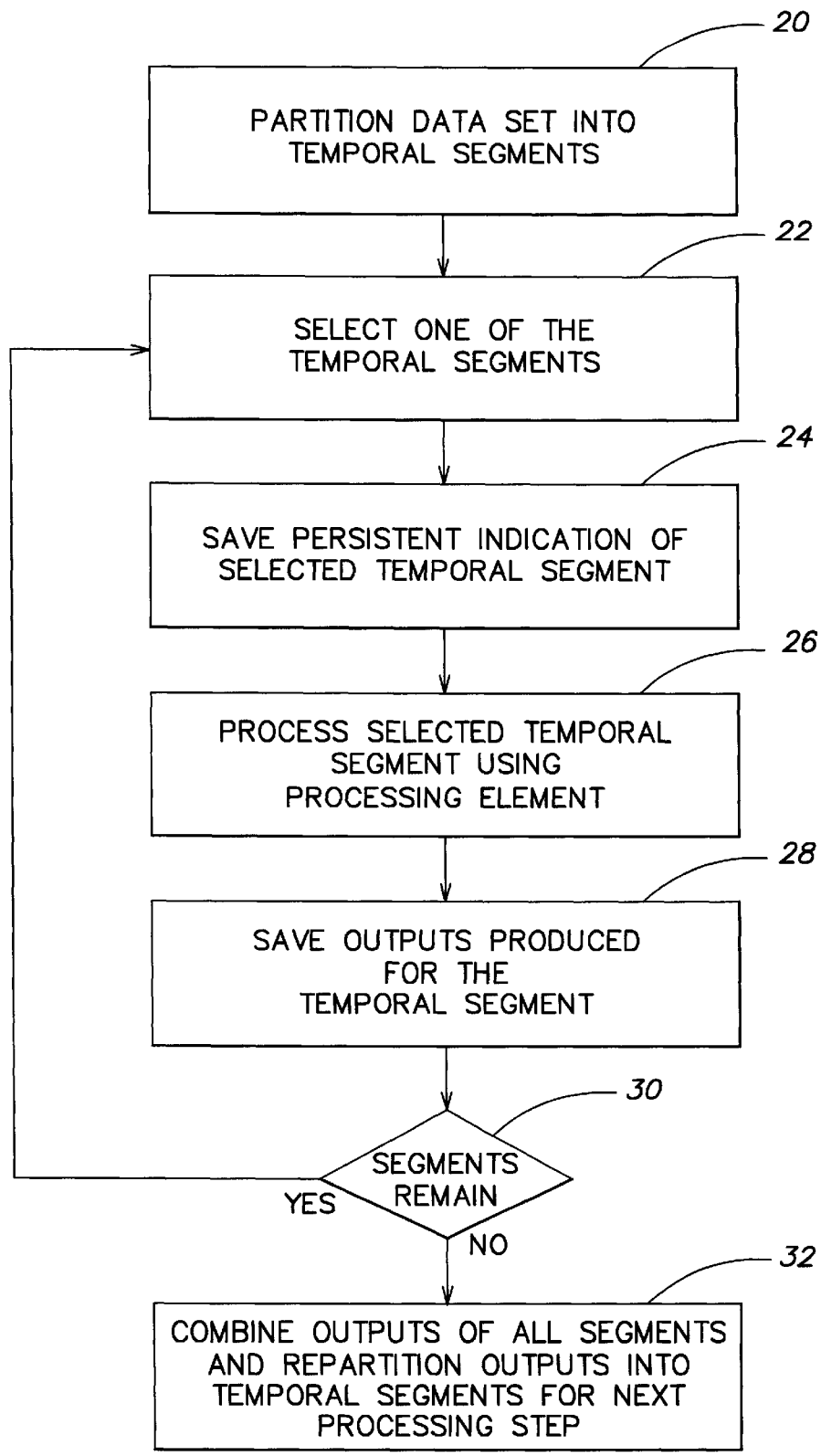
FIG. 2 is a flow chart describing how checkpointing may be performed by a processing environment.

The following detailed description should be read in conjunction with the attached drawing in which similar reference numbers indicate similar structures. All references cited herein are hereby expressly incorporated by reference.

FIG. 1A illustrates a dataflow diagram generally representing operations on data for which checkpointing is desired. In particular, FIG. 1A shows a processing element 10 which has an input for receiving a data set 12 and output to provide results 18. Checkpointing of operations performed by the processing element may be provided by partitioning the data set 12 into temporal segments so long as the operations performed by the processing element permit partitioning of the data. A processing framework in which the operations of the processing element 10 are performed may partition the data set 12 into temporal segments, successively select each of the segments to be processed, and control the operation of the processing element 10 so that this operation may be restartable. In particular, a persistent indication of the segment being processed is stored. The entire processing state need not be saved. If a failure occurs, processing can be restarted using the saved indication of the segment being processed.

FIG. 1B illustrates a block diagram in which processing of a data set by a processing element is performed by partitioning the data set into temporal segments. In particular, a processing element 10 receives data from a data set 12 through a partitioner 14. The partitioner 14 transforms the data set 12 into a plurality of temporal segments 16.

The data set 12 may be partitioned into a plurality of temporal segments 16 in a number of ways, generally specified by the processing element. When the processing element does not specify any rules by which the input data is partitioned then the data may be partitioned into temporal segments in any way. Hash or range partitioning may be used. These techniques are well known and are used in relational database products such as described in *Oracle DB2 Handbook*, Oracle Press, 1998, and *Informix Online XPS Feature Enhancements Guide*, version 8.1, Informix Press, 1996. Partitioning also may be performed using a decision tree, such as described in U.S. patent application Ser. No. 08/624,844, filed Mar. 25, 1996.

Partitioning also may be performed using a timer or a record counter with a threshold. Data is read until the threshold (in units of time or number of records) is met, indicating the end of the segment. For example, data read for a first half hour may be saved into a single temporal segment. Input data processed between one half hour and one hour may be saved into a second temporal segment, etc. When the data is partitioned by a partitioning technique which examines one or more key fields of the input data records (such as hash partitioning), then a timer may be used by reading an input which is sorted (or at least clustered) on the hash partitioning fields. After a timer expires, records are read until the next has partitioning key is reached, placing records up to this key into a single temporal segment.

Each temporal segment 16 is processed in order by the processing element 10 to provide results 18. The results for several temporal segments may be combined into a single data set if the results are to be repartitioned into different temporal segments for additional processing by other processing elements.

The production of a plurality of temporal segments 16 may be understood as a preprocessing step, i.e., a step that occurs prior to providing the data to processing element 10. The partitioner may be understood to be at the output of the preceding processing element that produces the data set 12. In other words, the previous step partitions the data for the next step in the sequence. By having a processing framework that performs partitioning as a preprocessing step, the processing element 10 may operate independently of and transparent to either any partitioning mechanism or any checkpoint or restart mechanism.

A flow chart describing how checkpointing is performed by a processing framework in which processing element in FIG. 1 operates will now be described in connection with FIG. 2. The data set is partitioned into temporal segments in step 20 by partitioner 14. One of the temporal segments is selected for the processing element 10 in step 22. A persistent indication of the selected temporal segment then is saved in step 24. The processing framework also may track for each processing element, which segments have been processed completely, which segment is to be processed next, which have failed and may be reprocessed, etc. The processing element 10 then processes the selected temporal segment (step 26). The outputs produced for the temporal segment then are stored in step 28, for example, in persistent storage. The steps 26 and 28 of production and storage may be performed in one step. The data stored may be stored in partitions for use by a subsequent processing element. If any temporal segments remain, as determined in step 30, processing continues with steps 22, repeating steps 24, 26, 28 and 30 until no segments remain. When no segments remain, the outputs for the temporal segments may be combined in step 32 if these results are to be repartitioned into temporal segments for a subsequent processing step.

Figure 3:
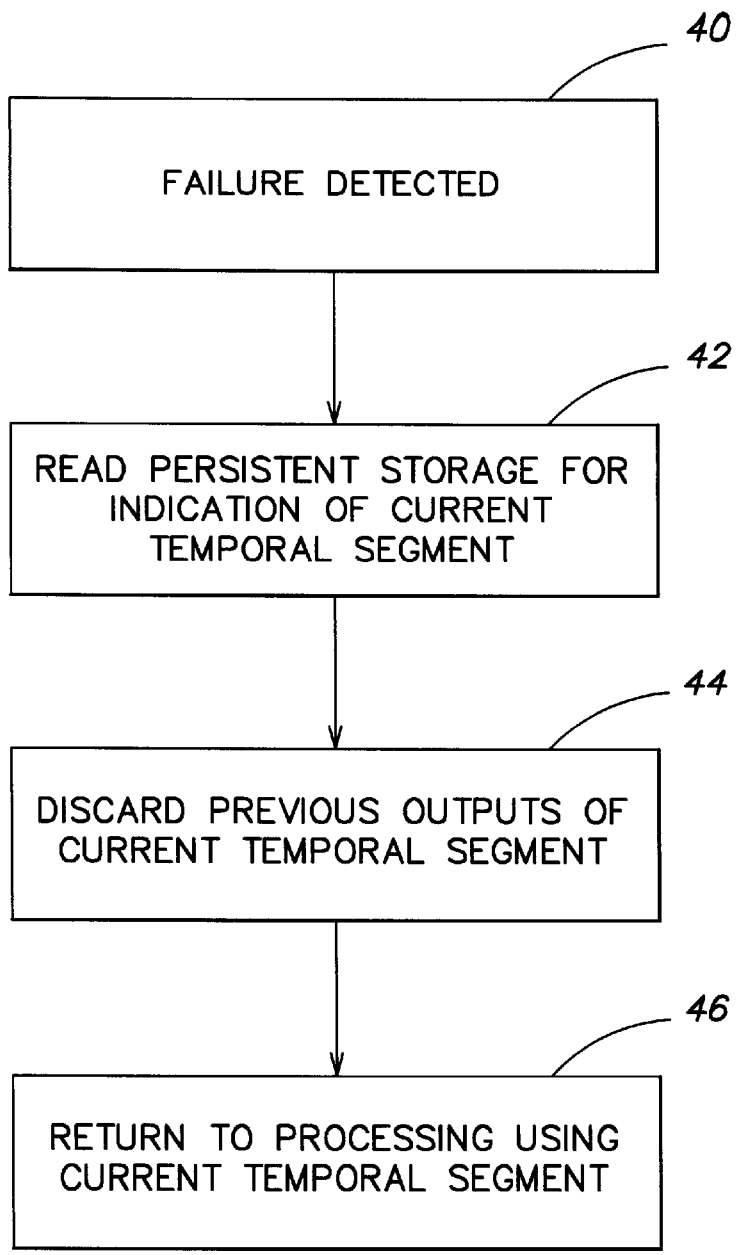
FIG. 3 is a flow chart describing how restarting may occur when a failure is detected.

If a failure occurs, then the persistent storage of the indication of the current temporal segment, and in some instances the outputs, permits rollback and recovery. The process of rollback and recovery is described in the flow chart of FIG. 3. If a failure is detected in step 40, the processing framework reads the indication of a current temporal segment from the persistent storage in step 42. Any outputs for the temporal segment are discarded (step 44). The processing element then may be restarted to process the current segment in step 46, returning to step 28 in FIG. 2 to save the outputs and process any remaining segments.

Figure 4:
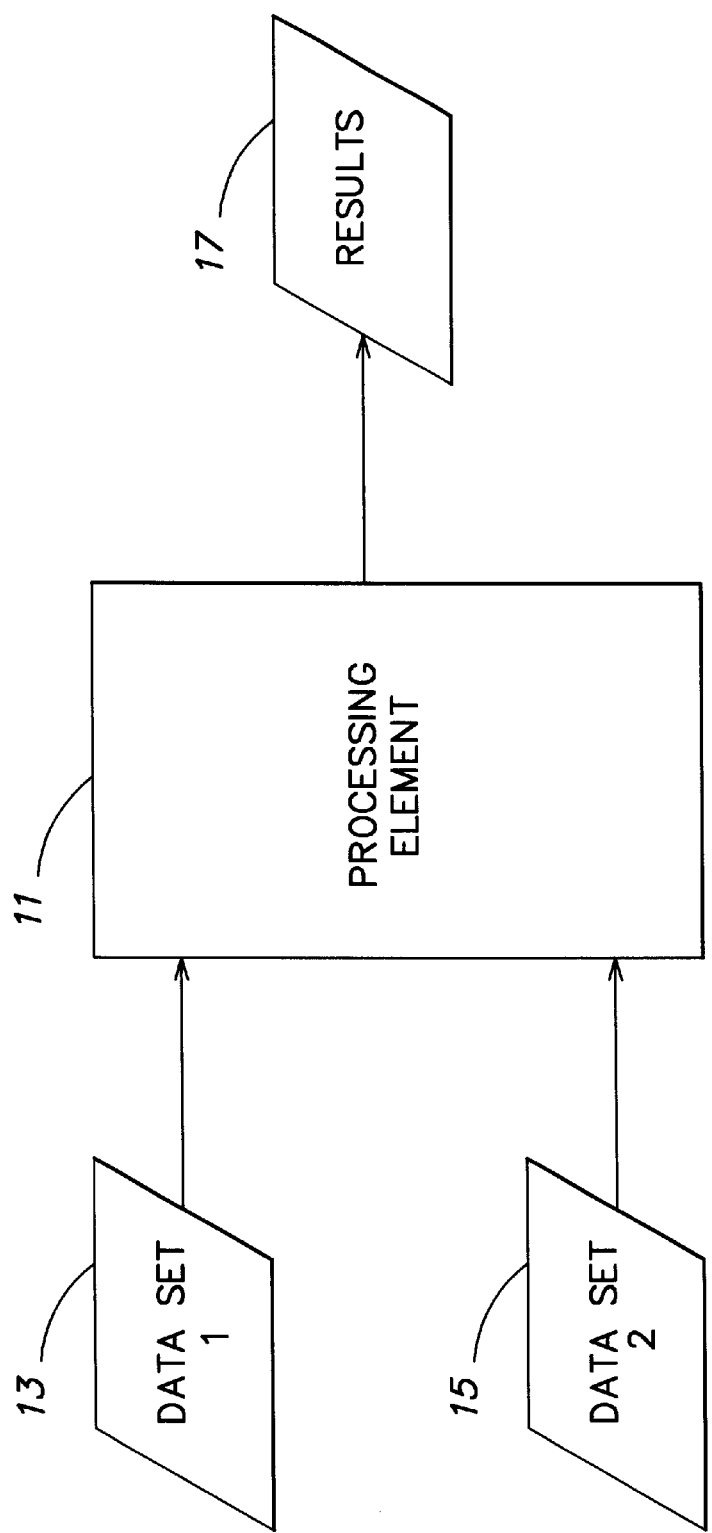
FIG. 4 is a dataflow diagram illustrating a processing element with multiple inputs.

Referring now to FIG. 4, a processing element 11 that has multiple inputs 13 and 15 in order to provide results 17 introduces some complexity into the checkpointing and partitioning mechanism. In this example, each of the inputs 13 and 15 is partitioned into the same number of temporal segments. If the partitioner is producing the temporal segments of the data sets 13 and using hash partitioning, the partitioners use the same hash function and the same hashing data keys. With such processing elements, the selection of one of the temporal segments involves the same temporal segment for each data set 13 and 15, both of which are processed by processing element 11.

There are some kinds of operations that may be performed by a processing element that do not permit the input data to be partitioned. Such operations, for example summations over an entire data set, are performed by processing elements which are commonly called summary operators or statistics operators. Generally, such operators examine every element of the data set in order to produce results. Some summary operators may be decomposed to two separate operators, one of which has a partitionable input and another of which has a non-partitionable input. Such summary operators generally are not restartable at a temporal segment boundary.

Figure 5:
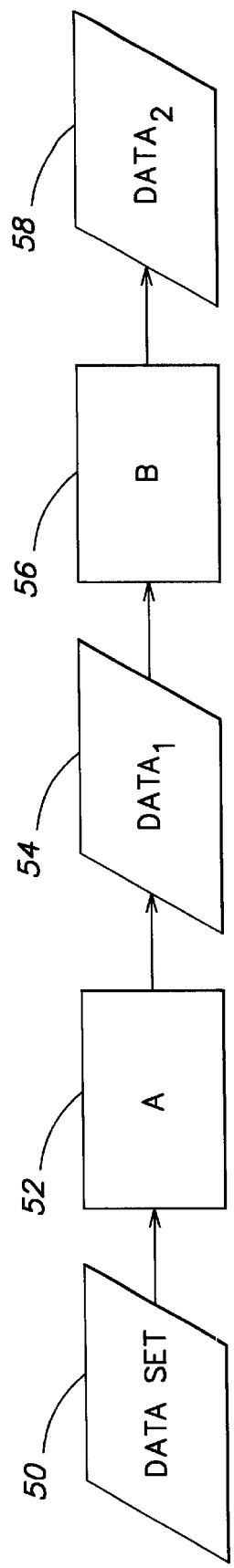
FIG. 5 is a dataflow diagram illustrating an example combination of processing elements.
Figure 6:
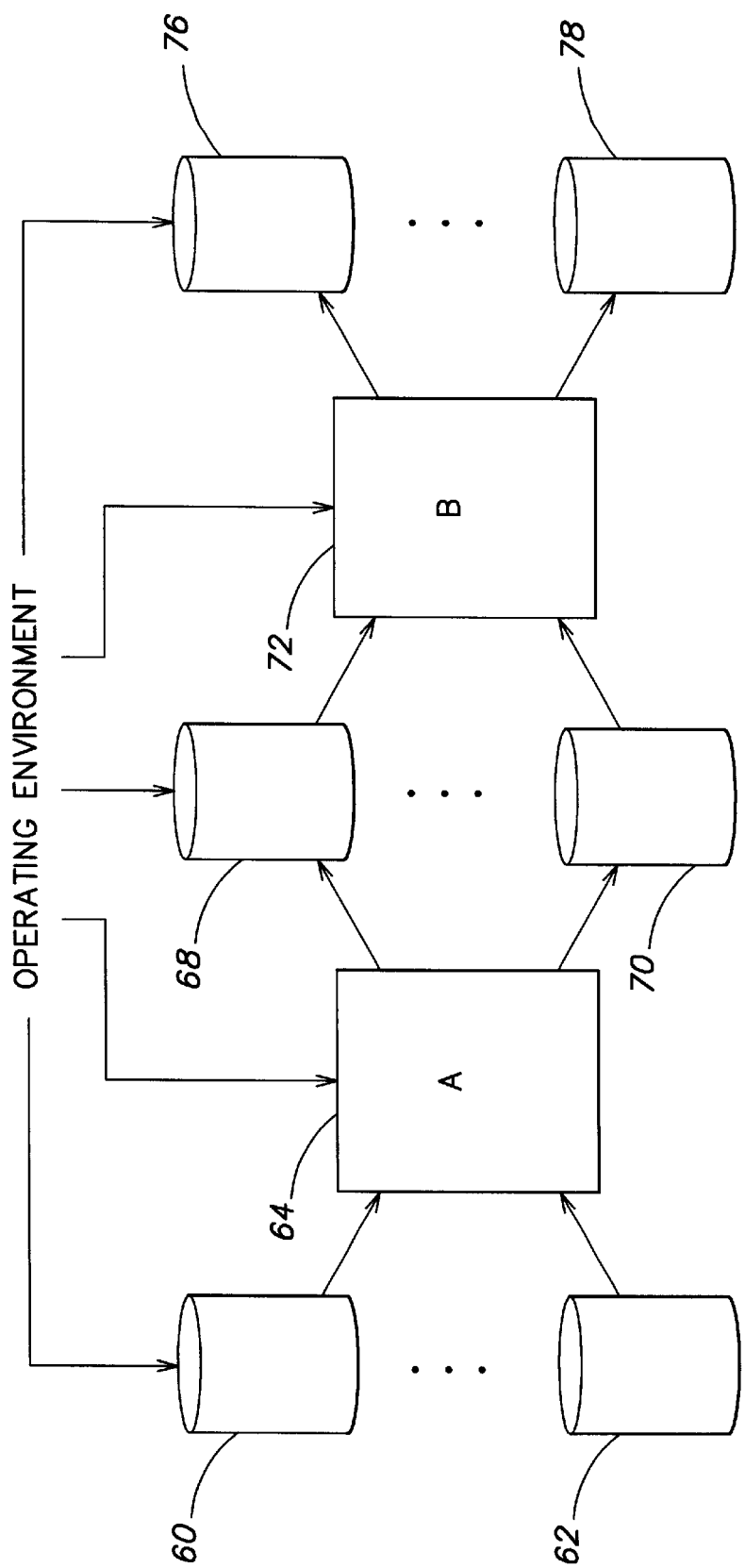
FIG. 6 is a dataflow diagram illustrating how partitioning may be used in connection with the dataflow diagram of FIG. 5.

Referring now to FIGS. 5 and 6, how checkpointing by partitioning is provided in one embodiment in a fully automated manner, transparent to the user, will now be described. Such transparency is provided under the assumption that the operation performed by a processing element either is side effect free or, if it has side effects on an external resource such as a database, is idempotent, i.e., the operation may be performed on the same input more than once without adverse side effects.

In this embodiment, the processing to be performed on the data is represented using a dataflow diagram. In a dataflow diagram, each processing element in the dataflow diagram is called an operator. An operator has one or more inputs and may provide one or more outputs. Several existing database systems permit the definition of operations to be performed on a database using a dataflow diagram. Such capability is provided by: the Orchestrate application environment from Torrent Systems, Inc., of Cambridge, Mass., which is described in U.S. patent application Ser. No. 08/627,801, filed Mar. 25, 1996; and the Volcano and Gamma database systems developed at the University of Wisconsin, such as described in D. DeWitt, et al., "GAMMA-A High Performance Dataflow Database Machine," Proc. 12th VLDB, Chicago, September 1986, Graefe, G., "Query Evaluation Techniques for Large Databases," *ACM Computing Surveys*, V. 25.2, pp. 73–170, June 1993, and Graefe, G., "Encapsulation of Parallelism in the Volcano Query Processing System," *SIGMOD Record*, Vol. 19, No. 2, pp. 102–111, June 1990, and Graefe, G., et al., "Encapsulation of Parallelism and Architecture-Independence in Extensible Database Query Execution," *IEEE Transactions on Software Engineering*, Vol. 19, No. 8, pp. 749–764, August 1993.

In order to provide checkpointing and restartability, the data structure representing the dataflow diagram should provide an indication of the operators in the dataflow diagram which permit partitioning of their input data, any kind of partitioning specified by the operator, and whether repartitioning of the input data is to be performed prior to an operator. The dataflow diagram is divided into separate individually checkpointed and restarted substeps wherever repartitioning is performed prior to an operator and wherever a summary operator occurs. Each substep is processed independently to provide checkpointing and restartability. For a substep of a dataflow diagram, the operators in the step process a current selected temporal segment. In other words, the processing element, such as shown at 10 in FIG. 1, may include any number of dataflow operators in a substep which are caused to process a selected temporal segment. The results from processing several temporal segments may be combined and repartitioned for subsequent processing by subsequent substeps of the dataflow diagram.

The identification of substeps of a dataflow diagram and the kinds of partitioning specified by operators in the dataflow diagram is a capability already provided by databases using dataflow parallelism. Such databases, are mentioned above, use partitioning of the data to provide parallel operation. Input data is partitioned and each operator in the data flow diagram is copied and executed on different processors. Any partitioning that can be performed on a dataflow diagram to provide partitions for parallel operation also can be used to provide temporal segments to support checkpointing and restartability.

FIG. 5 shows an example dataflow diagram representing an example set of operators for processing an input data set 50. Operator 52 has an input for receiving a data set 50 and an output providing data 54. Operator 56 has an input for receiving data 54 and an output providing data 58. The dataflow diagram of FIG. 5 may be defined as a dataflow diagram within an operating environment that coordinates partitioning of the data into temporal segments with checkpointability and restartability. In particular, as shown in FIG. 6, the data set 50 may include a plurality of segments 60 and 62. Operator 64 produces temporal segments of data 68 and 70. Operator 72 in turn provides the output segments 76 and 78. The transparency of the coordination of the checkpointing and restartability is independent of the kind of processing performed by the operators 64 and 72, if the processing is side effect free or has idempotent side effect behavior. These operations even may be provided by separate executable computer programs for which no source code is available.

Figure 7A:
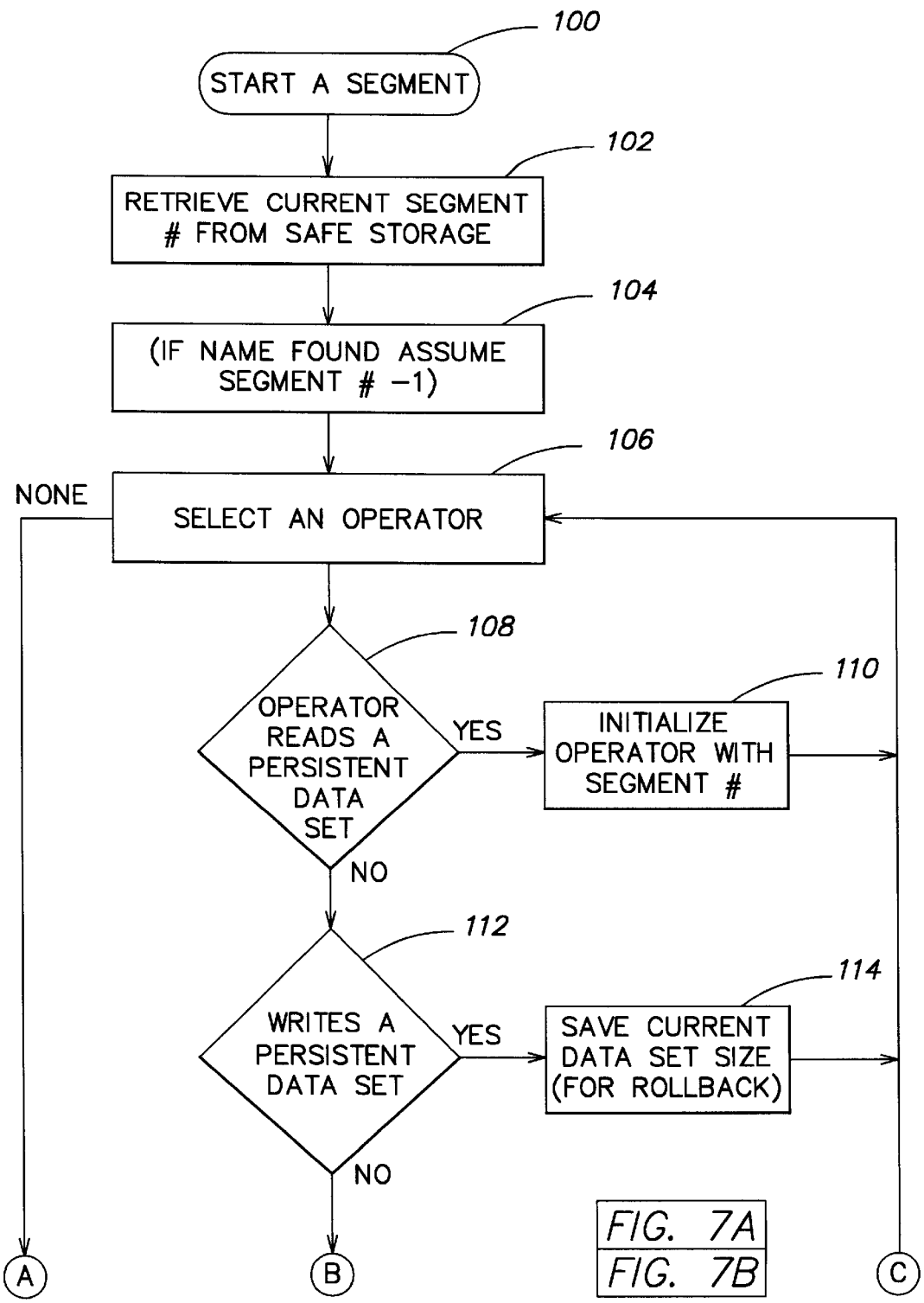
FIG. 7a and FIG. 7b comprise a flow chart describing in more detail how a processing environment provides checkpointing and restart capability.
Figure 7B:
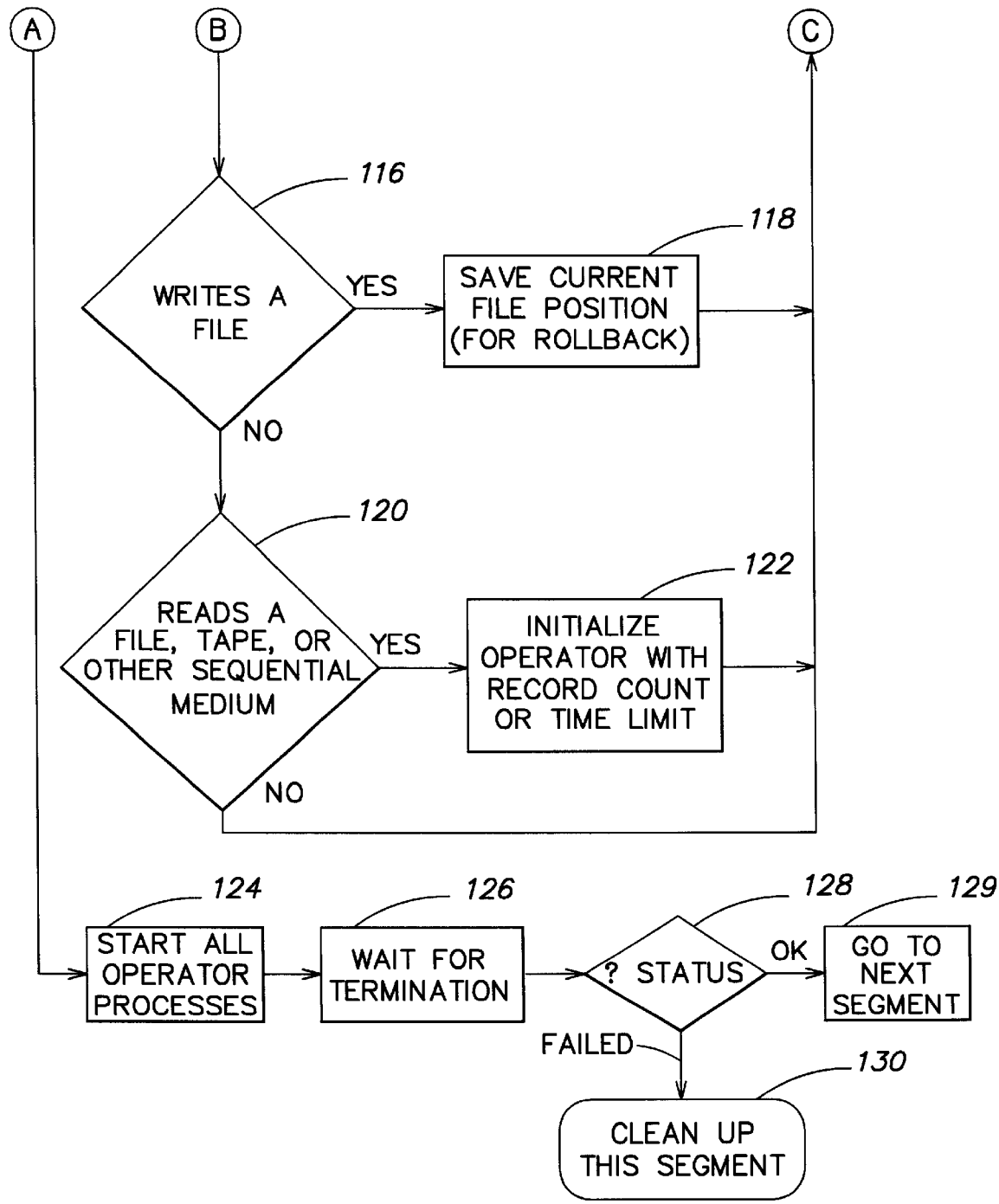

Referring now to FIGS. 7a and 7b, a more detailed description of the operation of the checkpointing by partitioning process on a substep of a dataflow diagram will be described.

Upon start or restart of processing a temporal segment, as indicated at step 100, a current segment number is retrieved from persistent storage in step 102. If no current segment number is found, as determined in step 104, the current segment number is assumed to be an initial number, such as 1. An operator of the substep is selected in step 106. This operator is one of the processing elements of the substep of the dataflow diagram representing the operation to be performed. If the operator is the kind of operator that reads a persistent data set, as determined in step 108, the operator is initialized with the current segment number in step 110. Processing then returns to step 106. If the operator writes a persistent data set, as determined in step 112, the current data set size is saved in step 114 for rollback purposes, and processing returns to step 106. If the operator writes a file, as determined in step 116, the current file position is saved in step 118 for rollback purposes, and processing returns to step 106. If the current operator reads a file, tape or other sequential medium, as determined in step 120, the operator is initialized in step 122 with a record count or time limit and a stored position from any preceding segment. Processing then returns to step 106.

After operators that need initialization have been initialized, the operator processes are then started in step 124 for processing the current temporal segment. Next, the system waits for termination of the processing of the current temporal segment by the operators in step 126. After termination, the status of this processing is determined in step 128. If the status is "failed," the segment is cleaned up in step 130 in a manner described in more detail below in connection with FIG. 8. Otherwise, the next segment is processed in step 129, which is described below in connection with FIG. 9.

Figure 9:
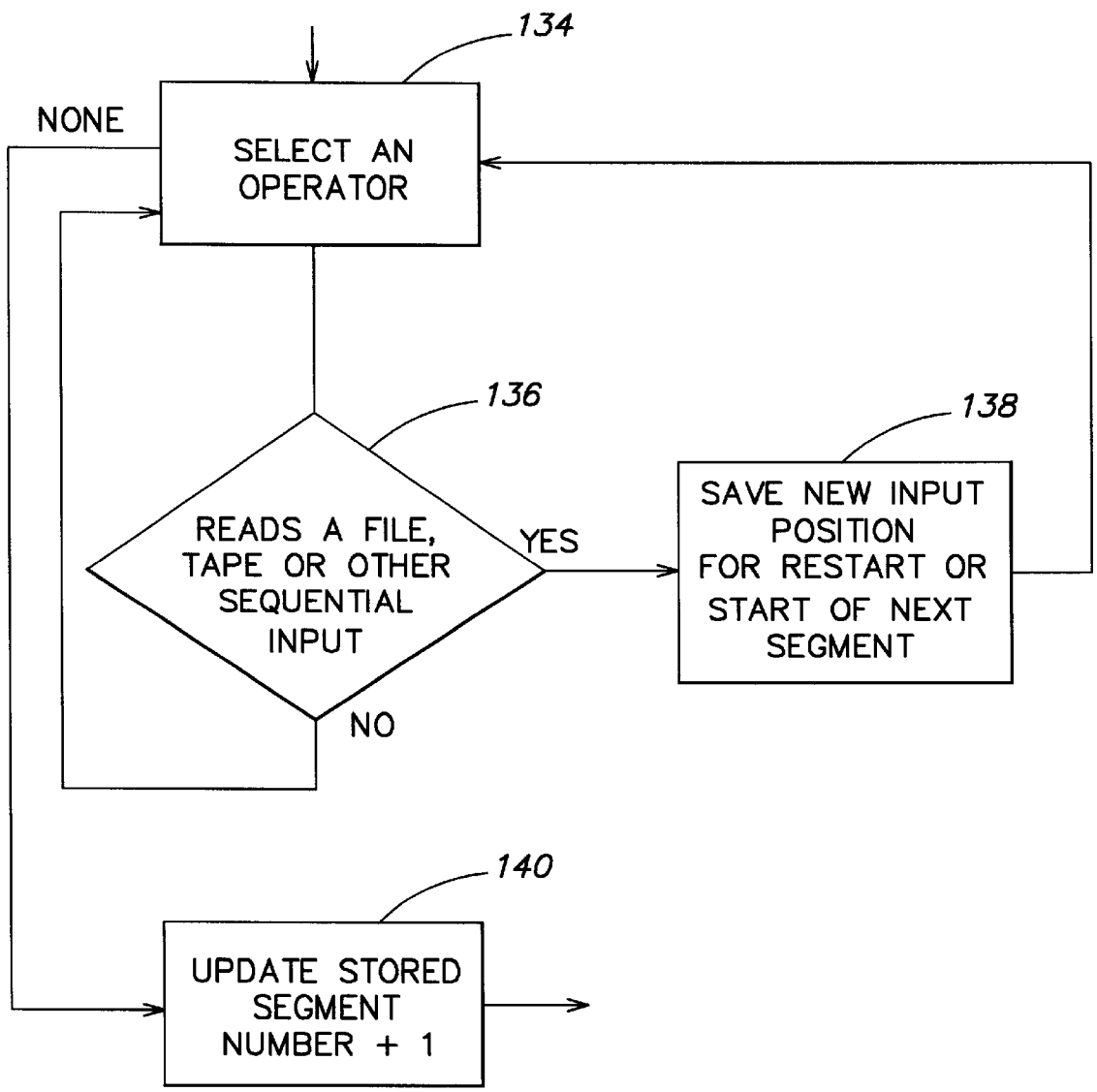
FIG. 9 is a flow chart describing post-processing performed after processing successfully completes on a selected segment.

In FIG. 9, an operator is selected in step 134. If the type of operator is such that it reads a file, tape or other sequential input as determined in step 136, a new input position for a restart or the start of next segment is saved in step 138 and processing returns to step 134. After the operators are processed through steps 134–138, the stored segment number is incremented in step 140, and the process of FIG. 7 may be repeated for the next segment.

Figure 8:
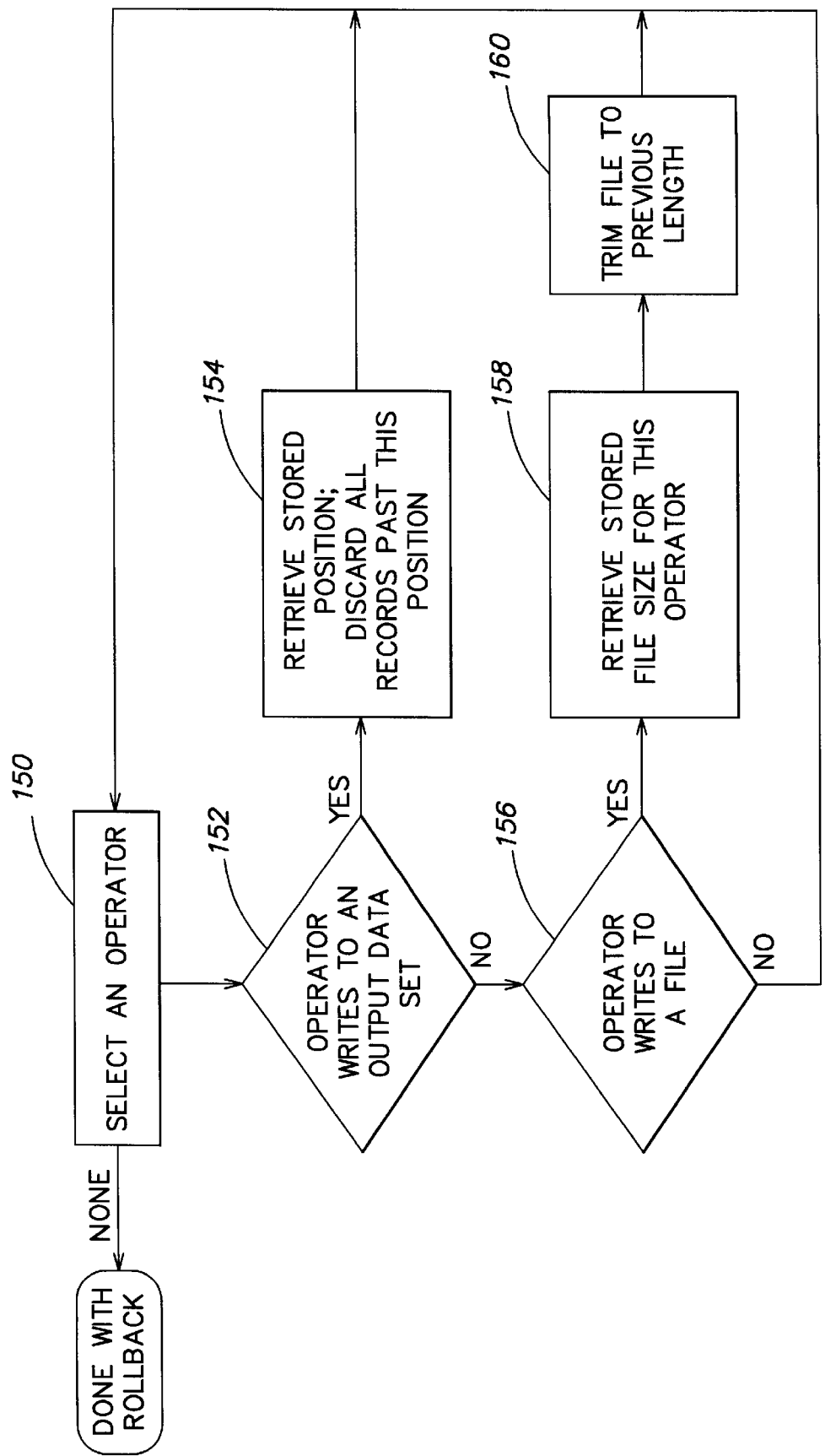
FIG. 8 is a flow chart describing in more detail how rollback operations are performed after a failure occurs during processing of a segment.

FIG. 8 illustrates step 130 of FIG. 7b in more detail. This process is performed when a failure occurs during processing of a temporal segment. First, an operator is selected in step 150. If the operator writes to an output data set, as determined in step 152, the stored position is retrieved in step 154 and records after this position are discarded. Processing returns to step 150 for selecting the next operator. If the operator writes to a file, as determined in step 156, the stored file size for this operator is retrieved in step 158. The file is trimmed to its previous length in step 160 and processing returns to step 150 for selecting the next operator.

In one embodiment, a timer may be used to allow many temporal segments to be processed one after the other without shutting down between them. Execution may be stopped at a temporal segment boundary after a timer expires, or the current temporal segment may be abandoned (and cleaned up). In this embodiment, the segment number is advanced not by 1, (step 140 in FIG. 9) but by the number of segments actually processed.

It should be noted that some operators read data sets and other operators read a file, tape or other sequential source until a record, count or time limit has been reached. The operators that read data sets read records of a temporal segment and then terminate normally. Operators that read from a sequential source start from the stored position which is where the previous segment stopped and then read a certain number of records or time limit. These two types of partitioning generally cannot be mixed and matched arbitrarily.

In some implementations, the data set may be extracted from a database through a query of the database. Because a database might not support positioning or seeking and because data retrieved through a query may arrive in different orders when retrieved at different times, the data set resulting from a query of the database may be placed into a persistent data set. The persistent data set is partitioned into temporal segments for processing. For example, an entire database query or table extraction may be done monolithically, with the resulting data stream completely extracted from the database and written to disk outside of the database as a single unit of work. This extraction step is neither partitioned nor restartable. If a failure occurs during processing of the database query, the query is re-executed.

Partitioning for the purposes of checkpointing and restartability may be used to complement partitioning used for parallel execution in database systems with dataflow parallelism. That is, use of partitioning of data into temporal segments does not interfere with use of partitioning for parallel execution. For example, a temporal segment of a data set may include multiple parallel partitions that can be processed simultaneously by a processing element. An operator may operate in parallel on parallel partitions of data.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A process for checkpointing operations on data by a processing element in a computer system, comprising:

partitioning the data into temporal segments for processing by the processing element;

selecting one of the temporal segments;

saving a persistent indication of the selected temporal segment;

processing the selected temporal segment by the processing element;

when a failure of the processing element is detected, discarding any outputs generated by the processing element for the selected temporal segment and reprocessing the selected temporal segment corresponding to the saved persistent indication; and when processing by the processing element completes without failure, saving the outputs produced by the processing element and selecting the next temporal segment to be processed by the processing element.

2. The process of claim 1, further comprising:

retrieving the data from a relational database using a query;

storing the data in persistent storage; and wherein the step of partitioning includes partitioning the data stored in persistent storage.

3. A computer system for checkpointing operations on data by a processing element in a computer system, comprising:

means for partitioning the data into temporal segments for processing by the processing element;

means for selecting one of the temporal segments;

means for saving a persistent indication of the selected temporal segment;

means for processing the selected temporal segment by the processing element;

means for when a failure of the processing element is detected, discarding any outputs generated by the processing element for the selected temporal segment and reprocessing the selected temporal segment corresponding to the saved persistent indication; and means for when processing by the processing element completes without failure, saving the outputs produced by the processing element and selecting the next temporal segment to be processed by the processing element.

4. The computer system of claim 3, further comprising:

means for retrieving the data from a relational database using a query;

means for storing the data in persistent storage; and wherein the means for partitioning includes means for partitioning the data stored in persistent storage.

* * * * *